(12) United States Patent (10) Patent No.: US 7,937,906 B2
Schmidhuber (45) Date of Patent: May 10, 2011

(54) FILLING APPARATUS

(75) Inventor: Josef Schmidhuber, Kraiburg (DE)

(73) Assignee: Multipond Wagetechnik, Waldkraiburg (DE)

( * ) Notice: Subject to any disclaimer, the term of this patent is extended or adjusted under 35 U.S.C. 154(b) by 156 days.

(21) Appl. No.: 11/661,483

(22) PCT Filed: Jun. 8, 2005

(86) PCT No.: PCT/EP2005/006157
§ 371 (c)(1),
(2), (4) Date: Feb. 25, 2008

(87) PCT Pub. No.: WO2006/131135
PCT Pub. Date: Dec. 14, 2006

(65) Prior Publication Data
US 2008/0196785 A1    Aug. 21, 2008

(51) Int. Cl.
*B65B 5/00* (2006.01)
*B65B 1/32* (2006.01)

(52) U.S. Cl. ............... 53/248; 53/502; 222/77

(58) Field of Classification Search ............ 53/502, 53/503, 239, 248, 260; 171/64, 65, 66, 90, 171/91, 92, 93; 222/55, 58, 77
See application file for complete search history.

(56) References Cited

U.S. PATENT DOCUMENTS

| | | | | |
|---|---|---|---|---|
| 379,231 A * | 3/1888 | Lamb | | 177/19 |
| 419,948 A * | 1/1890 | Henry | | 177/91 |
| 819,881 A * | 5/1906 | Hager | | 177/95 |
| 1,408,539 A * | 3/1922 | Simon | | 141/104 |
| 3,521,426 A * | 7/1970 | Evins | | 53/502 |
| 3,795,084 A * | 3/1974 | Richardson et al. | | 53/502 |
| 4,040,230 A * | 8/1977 | Pessel et al. | | 53/438 |
| 4,074,816 A * | 2/1978 | Legille | | 414/21 |
| 4,193,465 A * | 3/1980 | Henry | | 177/108 |
| RE31,944 E * | 7/1985 | Stromberg | | 53/438 |
| 4,570,419 A * | 2/1986 | Tinsley | | 53/473 |
| 4,616,722 A * | 10/1986 | Moran | | 177/99 |
| 4,874,048 A * | 10/1989 | Kawanishi et al. | | 177/25.18 |
| 5,121,775 A | 6/1992 | McClain | | |
| 6,286,717 B1 * | 9/2001 | Schmidhuber | | 222/77 |
| 7,310,923 B2 * | 12/2007 | Taylor | | 53/502 |

FOREIGN PATENT DOCUMENTS

| | | |
|---|---|---|
| CA | 2 452 671 | 1/2003 |
| DE | 375 773 | 5/1923 |
| DE | 513 548 | 11/1930 |
| EP | 0 113 586 | 7/1984 |

* cited by examiner

*Primary Examiner* — Paul R Durand
(74) *Attorney, Agent, or Firm* — Butzel Long

(57) ABSTRACT

This invention relates to a filling apparatus (2) and a process for intermittently receiving and discharging specific quantities of bulk product, in particular for delivering specific quantities of bulk product from a weighing machine to a packaging machine. The filling apparatus (2) comprises two partial vessels (8, 10), with each partial vessel (8, 10) comprising a feed opening (20, 22) and an outlet opening (26, 28). Furthermore, an outlet element (30) is provided which is movable at least into a first and into a second position. In the first position, the outlet element (30) closes the outlet opening (26) of a first partial vessel (8) and releases the outlet opening (28) of the second partial vessel (10). In the second position, the outlet element (30) closes the outlet opening (28) of the second partial vessel (10) and releases the outlet opening (26) of the first partial vessel (8).

23 Claims, 2 Drawing Sheets

Figure 2:
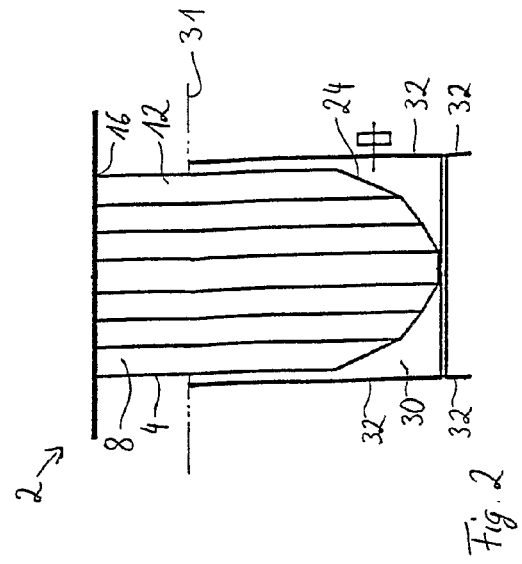

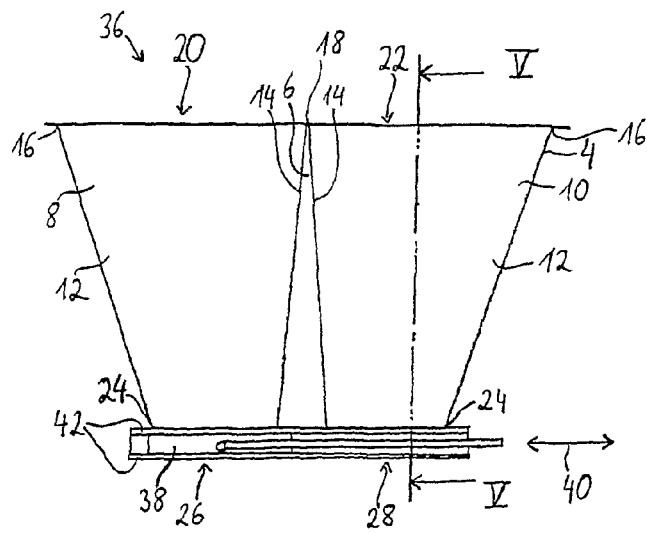
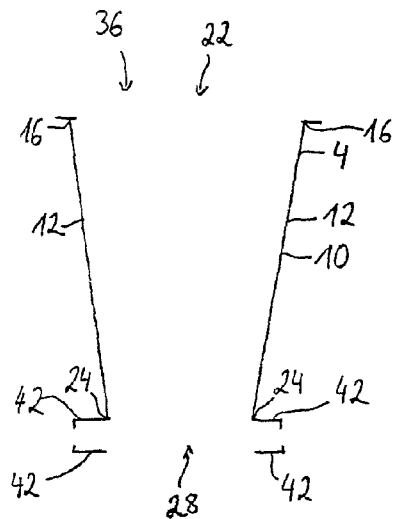
Fig. 4
Fig. 5
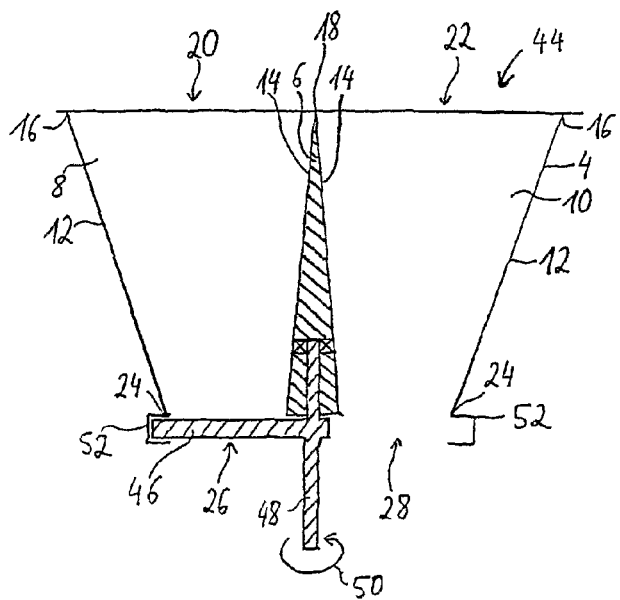
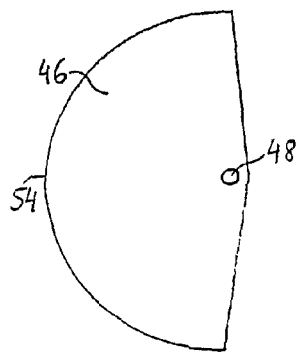
Fig. 6
Fig. 7

FILLING APPARATUS

The present invention relates to a filling apparatus and a method for intermittently receiving and discharging specific quantities of bulk product, particularly for the transfer of specific quantities of bulk product from a weighing machine to a packaging machine.

In the process of packaging bulk products into receptacles such as, for example, bags, cups, boxes, cans or the like, specific product quantities must be supplied to the packaging machine in a clock cycle. In the packaging machine, the product quantities supplied in a clock cycle will each be filled into corresponding receptacles and the receptacles will be subsequently closed. Packaged as bulk products as explained above are, for example, foods such as oats, sugar, flour, jelly bears, noodles, rice, but also other items which are delivered in large numbers such as, for example, screws, thumbtacks, nails, etc.

To achieve a high efficiency in the packaging process, packaging machines are adapted to introduce the bulk product into receptacles at high speeds. For the efficiency of this packaging process, a high cycle rate is aimed at for supplying specific quantities of the bulk product to the packaging machine. More than only one dosing or weighing device is frequently used for this.

From this plurality of dosing or weighing devices, the specific product quantities must pass—at the required cycle rate—via chutes or collecting hoppers to a feed opening of the packaging machine. At a high cycle rate, it must nonetheless still be ensured that the product quantity of a specific cycle does not mix with the product quantity of the preceding or subsequent cycle since the product quantities filled into the individual receptacles would vary thereby.

From document EP 0 113 586 A2, a combination balance is known which comprises two balances. Each of the two partial balances comprises its own chutes and its own collecting hoppers for the bulk product to be packaged. The two partial balances are working in an alternating cycle and provide their weighed portions each in an own receiving vessel which is arranged under the run-out of the appropriate collecting hopper. These two receiving vessels are symmetrically arranged above a feed opening of the packaging machine.

The two sidewalls of the receiving vessels taper in a wedge form toward the bottom. The sidewalls of the two receiving vessels which are facing each other are designed in the form of a swiveling flap. Each of the swiveling flaps has its own drive and is separately controlled. In the opened condition of the swiveling flap, the product contained in the corresponding receiving vessel is released in a downward direction. The sidewalls of the receiving vessels which are facing toward the outside are inclined such that the product flowing out will obtain a moving direction in the direction to the feed opening of the packaging machine.

The sidewalls each facing toward the outside are planar in design and have a linear, horizontally arranged tear-off edge. The bulk product thus glides over the entire width of the receiving vessel from it and then impacts—below the feed opening of the packaging machine—on the walls of the mostly round filling tube. The resulting flow deflection can result in turbulences and a distortion of the product flow.

It is the objective of the present invention to provide a filling apparatus which—when using more than only one weighing or dosing device—can discharge the bulk product in specific quantities at a high cycle rate and which is characterized by a simple design.

The problem is solved by a filling apparatus according to claim 1 and by a method according to claim 18. Additional preferred embodiments of the invention are subject of the sub-claims.

By providing more than one partial vessel, several weighing or dosing devices can be used in parallel, with each weighing or dosing device being assigned one partial vessel, respectively. By providing several partial vessels, the cycle rate of the product quantities to be supplied is not determined by the period of time of the weighing or dosing action since several weighing or dosing devices can be operated graded in time. Preferably, two weighing or dosing devices and two partial vessels are provided.

In accordance with the invention, one outlet element is provided which is movable such that, in a first position of the outlet element, the outlet opening of a first partial vessel will be closed by the outlet element, and the outlet opening of the second partial vessel will be released, while, in the second position, the outlet opening of the second partial vessel will be closed by the outlet element and the outlet opening of the first partial vessel will be released. By providing only one outlet element, the filling apparatus can be realized in a simple design and the control electronics for it can be simply designed. Also, only one drive is required for the outlet element so that this will result in cost savings.

In accordance with an advantageous embodiment of the invention, walls of the two partial vessels and/or tear-off edges of the outlet opening are curved. In this case, a curvature is not forcibly required over the entire circumference of the corresponding partial vessel or the outlet opening, respectively. The curvature is adapted such that an essentially laminar flow of the bulk product dropping down is generated underneath the outlet opening. This will avoid turbulences, and letting the bulk product out of the partial vessels, as well as filling it into a packaging machine arranged thereafter, can be performed at a high flow velocity of the bulk product. The arrangement of the two partial vessels and the curvature of the walls and tear-off edges are here designed such that the flow of the bulk product dropping down will be directed essentially to the same target location from the two outlet openings. Thus, it is achieved that product quantities which are let out from the first partial vessel as well as product quantities let out from the second partial vessel will each be introduced into a common feed opening of a packaging machine arranged downstream thereof.

In accordance with an advantageous embodiment, it is provided that the walls of the two partial vessels each continuously taper from the feed opening toward the outlet opening. Thus, a funnel-type arrangement of the partial vessels is achieved, with the feed opening forming the larger opening of the funnel which feed opening is, as a rule, arranged at the top of the funnel and the outlet opening forming the smaller opening of the funnel which outlet opening is, as a rule, arranged at the bottom of the funnel. This design allows fast filling and emptying of the partial vessels without any product being unintentionally lost.

In accordance with an advantageous embodiment of the invention, the tear-off edges of the outlet openings are designed such that—underneath the outlet openings—an in cross-section essentially circular flow of the product dropping down will be produced, respectively. Due to this, the outlet product flow has a similar cross-section as the filling tube of a packaging machine to be arranged underneath the filling apparatus so that the product flow's impact and deflection on the walls of the mostly round filling tube of the packaging machine will be minimized. As a result, the product flow is only slightly slowed down by the filling tube, and a high flow velocity of the product quantity can be achieved.

In accordance with an advantageous embodiment, the two partial vessels are forming one receiving vessel. Thus, a structurally compact and space-saving design of the filling apparatus is achieved. The receiving vessel is preferably divided into the two partial vessels by means of a separating web which extends from the feed openings to the outlet openings. Accordingly, the two feed openings as well as the two outlet openings are also divided by the separating web.

By increasing a thickness of the separating web in the direction to the outlet openings—in accordance with a further embodiment of this invention—the product's flow characteristics can be further improved.

In accordance with an advantageous embodiment, a drive is provided which is coupled to the outlet element and which is adapted to move the outlet element. Preferably only one drive will be required to move the outlet element into the first and the second position. Thus, the manufacturing costs and the maintenance expenditures for the filling apparatus can be kept low. The drive can be realized, for example, as a pneumatic or electromechanical drive as is known from the state of the art.

In accordance with one embodiment, a control is provided by means of which the drive is controllable. Preferably, such a control of the drive is coupled to further procedures in the packaging process, for example to the clock cycle of the automatic weighing machines and/or the packaging machine. Furthermore, sensors can be provided at different places of the weighing and packaging process which detect the progress of different procedures of the packaging process and which are coupled to the control.

In accordance with an advantageous embodiment, the outlet element is formed by a swivel plate which is swivably linked via a swivel axis. It is advantageous herein that a movement of the swivel plate is realizable by a reciprocating linear drive. Preferably, the swivel plate is swivably linked at the part of the separating web which is adjacent to the outlet openings. Thus, an advantageous flow behavior of the product flowing out is achieved, with a part of the product also flowing off over the swivel plate during the opening action of the swivel plate.

Due to the planes formed by the outlet openings forming—according to an advantageous embodiment—a swivel angle which is smaller than 180°, the movement of the swivel plate is reduced to a small distance of movement so that a small structural arrangement can be realized.

By providing a rim on the swivel plate according to an advantageous embodiment, it will be prevented that product flows off laterally during the opening action of the swivel plate. By means of the rim, the product is directed to the desired target location.

In accordance with an advantageous embodiment, the outlet element is formed by a linearly shiftable plate. Accordingly, through a reciprocating linear shift of the plate, the outlet openings of the partial vessels can be alternately opened and closed. The linear shift of such a plate can preferably be realized by a pneumatic drive in an inexpensive manner.

In accordance with an advantageous embodiment, the outlet element is formed by a rotatable plate, in particular, by a plate in the form of a circular sector. The drive is here simply realizable by a shaft which is driven by an electric motor, for example. Depending on the rotational angle position of the shaft, one outlet opening of the two partial vessels will be closed by the rotatable plate while the other outlet opening will be released. The provision of a rotatable plate as an outlet element is particularly well suited for a design of the filling apparatus where more than two partial vessels are provided. For this, the outlet openings of the plurality of the partial vessels are to be arranged circularly and the rotatable plate is to be designed as a sector of a circle such that all outlet openings, except one, are covered up by the rotatable plate. Accordingly, by stepwise rotation of the rotatable plate, the outlet openings of the different partial vessels are released individually one after the other while the other partial vessels whose outlet opening is covered by the rotatable plate can be filled.

Preferably, a guide rail can be arranged—for the linearly shiftable plate or the rotatable plate—to guide an edge of the plate. Such guide can prevent that the plate gives way under the weight of the bulk product and thus no longer completely closes the outlet opening.

In accordance with an advantageous embodiment, the filling apparatus according to this invention is used in a packaging station, comprising a weighing machine and a packaging machine to produce finished packages. Preferably, the weighing machine comprises several partial balances, with each partial balance being assigned a partial vessel of the filling apparatus. The outlet openings of the filling apparatus are preferably arranged such over a packaging machine feed opening that, from each outlet opening, the flow of the product dropping down is guided into the packaging machine feed opening.

With two partial vessels and two partial balances, the two partial vessels can be alternately filled and emptied by the corresponding partial balance. If more than two partial balances and correspondingly many partial vessels are provided, several partial vessels can be filled simultaneously, graded in time, while one individual partial vessel is emptied, wherein after emptying this one partial vessel, the outlet element is moved further so that a next partial vessel can be emptied while the emptied partial vessel and the remaining partial vessels can be further filled.

The advantages achieved by the method of the invention are essentially the same advantages which were explained with reference to the filling apparatus.

Figure 1:
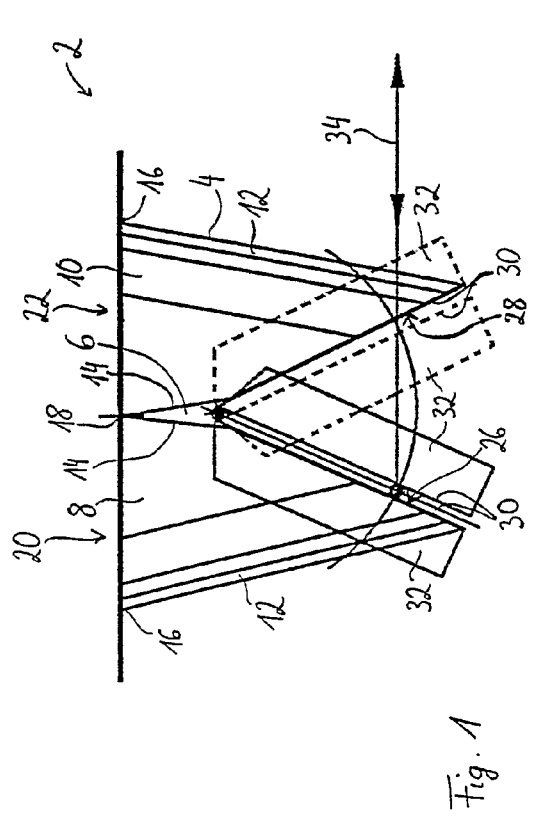
Figure 3:
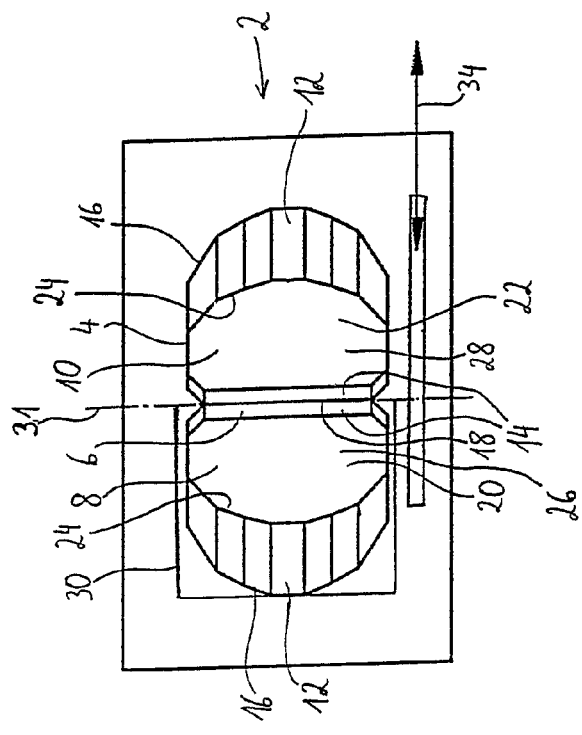

Further features and advantages of the invention are obvious from the description of embodiments on the basis of the enclosed drawings. The figures show:

FIG. 1 a schematic side view of a filling apparatus in accordance with a first embodiment of the invention;

FIG. 2 a schematic view of the filling apparatus of FIG. 1 from the front;

FIG. 3 a schematic plan view from the top onto the filling apparatus of FIG. 1;

FIG. 4 a schematic side view of a filling apparatus in accordance with a second embodiment of the invention;

FIG. 5 a sectional view along the line V-V of FIG. 4;

FIG. 6 a schematic sectional view of a filling apparatus in accordance with a third embodiment of this invention; and FIG. 7 a plan view from the top onto the outlet element of FIG. 6.

The following describes—with reference to FIG. 1—a filling apparatus 2 in accordance with a first embodiment of this invention. The filling apparatus 2 is formed by a receiving vessel 4 which is divided by a separating web 6 into two partial vessels 8 and 10. The walls of the partial vessels 8, 10, which are each formed by an exterior, curved outside wall 12 and a planar interior wall 14 adjoining the shell-type outside wall 12, are tapering in funnel fashion from top to bottom, as evident from FIGS. 1 and 3.

With the two partial vessels 8, 10, the respectively upper end 16 of the corresponding outside wall 12 is forming— together with the straight upper edge 18 of the separating web 6—the feed openings 20, 22 of the two partial vessels 8, 10.

As shown in FIGS. 1 and 3, the thickness of the separating web 6 increases toward the bottom, said thickness being measured vertically to the plane which is formed by the separating web 6. The respectively outer parts of the outside walls 12 extend further to the bottom than the separating web 6. The bottom edge 24 of the outside wall 12 forms together with the bottom end of the separating web 6 the outlet openings 26, 28 of the two partial vessels 8, 10, respectively. In use, the two partial vessels 8, 10 are filled from the top through the feed openings 20, 22 and emptied toward the bottom through the outlet openings 26, 28.

As evident from FIG. 1, the two outlet openings 26, 28 are facing each other which means that the planes formed by the bottom edge 24 of the two outlet openings 26, 28 form an angle of less than 180°. The bottom edge 24 of the outside wall 12 forms a tear-off edge for the product flow which flows out of the corresponding partial vessel 8, 10.

The walls 12, 14 of the two partial vessels as well as the tear-off edges are curved such that, underneath the outlet openings 26, 28, respectively, an essentially laminar flow of the bulk product dropping down will be generated and so that this flow is guided from both outlet openings essentially to the same target location. Furthermore, the tear-off edges and the walls 12, 14 of the two partial vessels 8, 10 are curved such that an in cross-section essentially circular flow of the product dropping down will be generated.

Due to this flow behavior, the product flowing out can be effectively filled into a feed opening (not shown) of a packaging machine arranged downstream. Swirls and turbulences of the product upon impacting on the filling tube of the packaging machine will be minimized and a distortion of the product flow can be largely avoided. The uniform curvature of the outside walls 12 furthermore prevents the product from sticking on.

As evident from FIG. 1, a swivel plate 30 forming an outlet element of the two partial vessels 8, 10 is swivably linked at a lower end of the separating web 6. The swivel axis 31 of the swivel plate 30 runs essentially horizontally. The swivel plate 30 can be swiveled over an angle such that, in a first position, it closes the outlet opening 26 of a first partial vessel 8 and releases the outlet opening 28 of the second partial vessel 10 (see the continuous line in FIG. 1), and such that, in a second position, it closes the outlet opening 28 of the second partial vessel 10 and releases the outlet opening 26 of the first partial vessel 8 (see the broken line in FIG. 1). The swiveling angle formed between the first and the second position corresponds to the angle which is formed by the two planes which are formed by the bottom edge 24 of the outlet openings 26, 28.

As evident from FIGS. 2 and 3, the swivel plate 30 is essentially rectangular. On the two opposite side edges of the swivel plate 30 which adjoin the swivel axis 31, a rim 32 is provided respectively projecting to both sides of the swivel plate and angled with regard to the swivel plate. The rim 32 prevents a lateral product flow-off (i.e. in the direction of the swivel axis 31) when the swivel plate 31 is opened and thus guides the product upon flowing out into the direction of the desired target location. The geometry of the swivel plate 30, of the rim 32, and of the walls 12, 14 of partial vessels 8, 10 is adapted such that unhindered product flow will come about when the swivel plate 30 is opened.

As shown schematically in FIG. 1 by the arrow 34, a linear, reciprocally moving drive (not shown) is provided which is linked on a section of the swivel plate 30, at a distance from the swivel axis 31. The drive for the reciprocating linear movement can be realized for example by a pneumatically operated piston or by an electric motor which drives a corresponding crank. The moving distance of the drive is here adjusted such that the swivel plate 30 is movable from the first to the second position and back again as is shown in FIG. 1 by the continuous and the broken lines. Alternatively, in an advantageous manner, the swivel axis 31 can itself be turned alternately via a rotary motor like an electric motor which drives it directly.

The following describes the use of the filling apparatus in a packaging station. The filling apparatus 2 is positioned such that the feed openings 20, 22 of the two partial vessels 8, 10 are each arranged underneath an outlet (not shown) of a corresponding partial balance. The two partial balances are working in an alternate cycle so that alternatingly from the one and the other outlet of the partial balances a correspondingly weighed product quantity will be discharged. Starting with the position of the swivel plate 30 which is shown in FIG. 1, initially a first partial vessel 8 (in FIG. 1 the left partial vessel) is filled from the corresponding partial balance. After filling the first partial vessel 8, the swivel plate 30 is swiveled into the second position which is presented in FIG. 1 in broken lines. This releases the outlet opening 26 of the first partial vessel 8 and closes the outlet opening 28 of the second partial vessel 10. The product contained in the first partial vessel 8 now flows out of the partial vessel 8 and is directed into a packaging machine feed opening (not shown). While the product flows out of the first partial vessel 8, a filling of the second partial vessel 10 can be simultaneously done in an advantageous manner, the second partial vessel being closed by the swivel plate 30. Of course, filling of the second partial vessel 10 can also occur only after emptying the first partial vessel 8. After filling of the second partial vessel 10 and the complete emptying of the first partial vessel 8, the swivel plate 30 is swiveled back into the first position again so that it releases the outlet opening 28 of the second partial vessel 10 and closes the outlet opening 26 of the first partial vessel 8. The product contained in the second partial vessel 10 flows out from it and is directed to a packaging machine feed opening arranged underneath it, while filling of the first partial vessel 8 from the corresponding partial balance can be performed simultaneously. When the filling action of the first partial vessel 8 is completed and the second partial vessel 10 is completely emptied, the described cycle will be started again.

As is evident from the description, the swivel plate 30 performs two functions. It is not only the closed bottom flap of the one but also the opened bottom flap of the other partial vessel 8, 10. Thus, both functions are implemented with only one operated component. The filling apparatus 2 is thus especially suitable for use in combination with a weighing machine wherein product is alternately delivered from two partial balances.

With reference to the FIGS. 4 and 5, the following describes a filling apparatus 36 in accordance with a second embodiment of this invention. The arrangement corresponds in many features with the filling apparatus 2 in accordance with the first embodiment so that partly the same reference numbers will be used. The following essentially explains only the differences versus the first embodiment.

In accordance with the first embodiment, the filling apparatus 36 is formed by a receiving vessel 4 which is divided by a separating web 6 in two partial vessels 8, 10. The outside walls 12 of the two partial vessels 8, 10, the interior walls 14 of the separating web 6 and the bottom edge 24 forming a tear-off edge for the product flow are adapted such that a product flow of the product flowing out of the partial vessels 8, 10 is achieved as has been described with reference to the first embodiment. The feed openings 20, 22 of the two partial vessels 8, 10 are formed by the top end 16 of the curved outside walls 12 and by the straight edge 18 of the separating web 6. In contrast to the first embodiment, the separating web 6 extends as far downwards as the bottom edge 24 of the outside walls 12 so that the two outlet openings 26, 28 which are formed by the bottom edge 24 and the bottom end of the separating web 6 are both arranged in a horizontal plane.

In contrast to the first embodiment, the outlet element by which the two outlet openings 26, 28 of the filling apparatus 36 are alternately opened or closed, respectively, is formed by a linearly movable plate 38. The plate 38 is linearly movable in the direction of the arrow 40 by a corresponding drive so that the plate—in a first position—closes the outlet opening 26 of a first partial vessel 8 and releases the outlet opening 28 of the second partial vessel whereas—in a second position—it closes the outlet opening 28 of the second partial vessel 10 and releases the outlet opening 26 of the first partial vessel 8.

As evident on the basis of the schematic sectional view of FIG. 5, guide rails 42 are arranged to the side from the bottom edges 24 of the outside walls 12, said guide rails guiding the linearly movable plate 38 on both sides along its direction of movement 40. FIG. 5 does not show the linearly movable plate 38 and other parts behind the section plane. The guide rails 42 are arranged in such a manner laterally from the outlet openings 26, 28 that the product flow flowing out of the corresponding partial vessel 8, 10 will not be influenced by the guide rails 42.

The operation of the filling apparatus 36 is similar as has been described with reference to FIG. 1 to 3 for the first embodiment. However, instead of the alternate swiveling movement of the swivel plate 30, an alternate linear shift of the linearly movable plate 38 is here performed.

The following describes with reference to FIGS. 6 and 7 a filling apparatus in accordance with a third embodiment of the invention. FIG. 6 presents the filling apparatus 44 in a schematic sectional view. The filling apparatus 44 corresponds in many features with the filling apparatus 2 according to the first embodiment so that partly the same reference numbers will be used. The following essentially addresses the differences versus the first embodiment.

The filling apparatus 44 again comprises a receiving vessel 4 which is divided by a separating web 6 into two partial vessels 8, 10. The outside walls 12, the interior walls 14 and the bottom edge 24 forming a tear-off edge for the product flow are again adapted such that a product flow is achieved as it has been explained with reference to the first embodiment. As in the second embodiment, the separating web extends as far down to the bottom as a bottom edge 24 of the outside walls 12 so that the bottom end of the separating web 6 forms together with the bottom edges 24 of the outside walls 12 the outlet openings 26, 28 of the two partial vessels 8, 10, with the outlet openings 26, 28 being arranged in a common horizontal plane.

In contrast to the first two embodiments, the outlet element by which the two outlet openings 26, 28 are alternately opened and closed, respectively, is provided in the form of a rotatable plate 46 in the form of a sector of a circle. The rotatable plate 46 is provided on a shaft 48 wherein this arrangement does not permit a relative rotation of the components. The top end of the shaft 48 extends beyond the rotatable plate 46 into a lower part of the separating web 6 and is rotatably supported therein. The lower part of the shaft 48 extends downwards from the rotatable plate 46 and is coupled to a rotary drive, such as an electric motor for example.

As evident from the top view of FIG. 7, the sector of the plate 46 substantially covers a semicircle. Thus, it will be ensured that, in a first rotary position of the rotatable plate, the outlet opening 26 of a first partial vessel 8 will be closed and the outlet opening 28 of the second partial vessel 10 will be released as shown in FIG. 6, while in a second rotary position, the outlet opening 28 of the second partial vessel 10 will be closed and the outlet opening 26 of the first partial vessel 8 will be released. To achieve the functionality of the alternating opening and closing of the two outlet openings 26, 28 as this was described with reference to the first two embodiments, the rotatable plate 46 can either be rotated back and forth alternately with the required rotary angle or can be continuously turned in a specific direction of rotation, as indicated by the arrow 50.

Laterally from the bottom edges 24 of the outside walls 12, guide rails 52 running in circumferential direction are arranged which guide rails 52 guide a circumferential edge 54 of the rotatable plate 46. The guide rails 52 are arranged laterally of the outlet openings 26, 28 such that the flow of the outflowing product from the two partial vessels 8, 10 is not influenced by the guide rails 52.

The filling apparatus 44 is essentially operated in the same manner as this has been described for the first two embodiments. However, instead of the swiveling movement of the swivel plate 30 and instead of the linear shifting of the movable plate 38, a rotation of the rotatable sector plate 46 is performed to alternately open and close the two outlet openings 26, 28, respectively.

This invention is not limited to the embodiments shown in the Figures. In particular, it is not required that a linearly extending separating web 6 is provided; rather, this can also be curved in design. Also, the slope of the walls, the size of the openings and the curvature of the walls as well as of the tear-off edges can be differently selected in accordance with the product to be packaged. The curvature of the walls and the tear-off edges can be designed continuously or graduated.

Furthermore, it can be provided that the movement of the outlet element is detected by sensors. Furthermore, the movement of the outlet element—as has already been explained—can be coupled to further processes, e.g. to the weighing process in the weighing machine and/or the packaging action of the packaging machine, with a control for this being preferably provided.

The described filling apparatus is not only suitable in combination with a weighing device but also in combination with a different dosing device, such as e.g. a dosing device which doses the product quantities according to their volume.

In contrast to the embodiments shown in the Figures, the filling apparatus may also comprise more than only two partial vessels. In this case, different possibilities for combinations will result. If a swivel plate is used as the outlet element, as has been shown in FIGS. 1 to 3, it is advantageous to provide two partial vessels each with one common swivel plate 30. If a rotatable plate is provided, as shown in FIGS. 6 and 7, more than only two partial vessels whose outlet openings are arranged in a circular form can be provided with only one rotatable plate, as has already been described in the introductory part of the specification.

Of course, the guide rails 42, 52 shown in FIGS. 5 and 6 can also be arranged further outside from the outlet openings 26, 28 so that the outflowing product flow will not be influenced by the guide rails 42, 52.

In the embodiment of FIG. 1 to 3, the rim 32 is arranged perpendicularly to the swivel plate 30. Of course, this can also be angled at a different desired angle to the swivel plate 30 and can also extend only over a part of the side length of the swivel plate 30. In particular, the rims 32 can each form an obtuse angle with the swivel plate 30. In FIG. 1 to 3, the swivel plate 30 has a double bottom. Of course, this can also be designed as a single bottom.

The invention claimed is:

1. A filling apparatus for intermittently delivering quantities of bulk product to a packaging machine, wherein the filling apparatus comprises:
    a first partial vessel having a feed opening and an outlet opening;
    a second partial vessel having a feed opening and an outlet opening;
    a single swivel plate which is movable between at least a first position, wherein the swivel plate blocks the outlet opening of the first partial vessel, and a second position, wherein the swivel plate blocks the outlet opening of the second partial vessel;
    wherein, in the first position thereof, the swivel plate is out of the path of travel defined through the outlet opening of the second partial vessel such that product is releasable from the second partial vessel, and wherein, in the second position thereof, the swivel plate is out of a path of travel defined through the outlet opening of the first partial vessel such that product is releasable from the first partial vessel;
    wherein the first and second partial vessels are divided by a separating web, the single swivel plate being movably connected to the separating web proximate the outlet openings of the first and second partial vessels; and
    wherein the outlet openings of the first and second partial vessels face each other so that planes formed by the outlet openings enclose a swivel angle which is smaller than 180°, and wherein the swivel plate can swivel over this swivel angle.

2. A filling apparatus according to claim 1, wherein each of the first and second partial vessels include walls and the outlet openings of each of the first and second partial vessels include bottom edges and at least one of the walls of the first and second partial vessels and the bottom edges of the first and second partial vessels are curved so that, underneath the outlet openings, respectively, a substantially laminar flow of the bulk product dropping down is generated upon discharge of the bulk product from the filling apparatus which substantially laminar flow of the bulk product is directed from the outlet openings of each of the first and second partial vessels essentially to a common target location.

3. A filling apparatus according to claim 1, wherein each of the walls of each of the first and second partial vessels taper continuously from the respective feed opening to the respective outlet opening.

4. A filling apparatus according to claim 1, wherein bottom edges of the outlet openings are configured so that underneath the outlet openings a substantially circular cross-sectional flow of the product dropping down will be produced, respectively.

5. A filling apparatus according to claim 1, wherein the first and second partial vessels comprise one receiving vessel which is divided to form the first and second partial vessels by the separating web, the separating web extending from the feed openings to the outlet openings.

6. A filling apparatus according to claim 5, wherein a thickness of the separating web increases in a direction that extends from the feed openings towards the outlet openings.

7. A filling apparatus according to claim 1, further comprising a drive that is coupled to and moves the swivel plate.

8. A filling apparatus according to claim 7, further comprising a controller which controls operation of the drive.

9. A filling apparatus according to claim 1, wherein the swivel plate is rectangular with a rim provided on opposite side edges adjoining a swivel axis of the swivel plate, said rim respectively projecting on opposite sides of the swivel plate and being angled with respect to the swivel plate.

10. The combination of a filling apparatus according to claim 1 with a packaging station that comprises a weighing machine and a packaging machine.

11. The combination according to claim 10, wherein the weighing machine comprises two partial balances, with the feed openings of the filling apparatus being arranged under outlets of the partial balances, and with the outlet openings of the filling apparatus being arranged such over a feed opening of the packaging machine, so that a flow of the product dropping down from the outlet openings is guided into the packaging machine feed opening.

12. Process for intermittently receiving and discharging quantities of bulk product from a weighing machine to a packaging machine, wherein the following steps are at least once successively performed in the method:
    filling a specific quantity of bulk product into a first partial vessel through a first feed opening provided I the first partial vessel;
    moving a single swivel plate from a first position into a second position so as to open an outlet opening of the first partial vessel and close an outlet opening of a second partial vessel and wherein, in the second position thereof, the swivel plate is out of a path of travel defined through the outlet opening of the first partial vessel so that product may be discharged from the first partial vessel;
    discharging product from the first partial vessel and simultaneously or subsequently filling a specific quantity of bulk product into the second partial vessel through a second feed opening provided in the second partial vessel;
    moving said swivel plate from the second position into the first position so as to open the outlet opening of the second partial vessel and close the outlet opening of the first partial vessel and wherein, in the first position thereof, the swivel plate is out of a path of travel defined through the outlet opening of the second partial vessel so that product may be discharged from the second partial vessel;
    wherein the first and second partial vessels are divided by a separating web, the single swivel plate being movably connected to the separating web proximate the outlet openings of the first and second partial vessels; and
    wherein the outlet openings of the first and second partial vessels face each other so that planes formed by the outlet openings enclose a swivel angle which is smaller than 180°, and wherein the swivel plate can swivel over this swivel angle.

13. A method according to claim 12, wherein the steps of filling and moving are controlled by a control device.

14. A method according to claim 13, that is performed in a packaging station, which packaging station comprises a weighing machine and a packaging machine for producing finished packages, wherein the control of filling and moving by the control device is coupled to the process of the weighing machine, the packaging machine and/or to motion sensors.

15. A filling apparatus for intermittently delivering quantities of bulk product from a weighing machine to a packaging machine, wherein the filling apparatus comprises:
    a first partial vessel having a feed opening and an outlet opening;
    a second partial vessel having a feed opening and an outlet opening;

one outlet element which is movable between at least a first position wherein the outlet element blocks the outlet opening of the first partial vessel, and a second position, wherein the outlet element blocks the outlet opening of the second partial vessel;

wherein in the firs osition thereof the outlet element is out of the rath of travel defined through the outlet opening of the second partial vessel such that product is releasable from the second partial vessel, and wherein, in the second position thereof, the outlet element is out of apath of travel defined through the outlet opening of the first partial vessel such that product is releasable from the first partial vessel;

wherein the first and second partial vessels are divided by a separating web, the one outlet element being movably connected to the separating web proximate the outlet openings of the first and second partial vessels; and wherein the outlet element comprises a plate that is rotatable about a substantially vertical axis between the first and second positions of the outlet element.

16. A filling apparatus according to claim 15, wherein the plate defines a substantially semi-circular shape.

17. A filling apparatus according to claim 16, wherein the plate is monolithic.

18. A filling apparatus according to claim 15, wherein the substantially vertical axis is defined by a shaft, the plate being associated with the shaft.

19. A filling apparatus for intermittently delivering quantities of bulk product from a weighing machine to a packaging machine, wherein the filling apparatus comprises:

a first partial vessel having a feed opening and an outlet opening;

a second partial vessel having a feed opening and an outlet opening; and one outlet element which is movable between at least a first position, wherein the outlet element blocks the outlet opening of the first partial vessel, and a second position, wherein the outlet element blocks the outlet opening of the second partial vessel;

wherein, in the first position thereof, the outlet element is out of the path of travel defined through the outlet opening of the second partial vessel such that product is releasable from the second partial vessel, and wherein, in the second position thereof, the outlet element is out of a path of travel defined through the outlet opening of the first partial vessel such that product is releasable from the first partial vessel; and wherein the outlet element comprises a plate that is rotatable about a substantially vertical axis between the first and second positions of the outlet element.

20. A filling apparatus according to claim 19, wherein the plate defines a semi-circular shape.

21. A filling apparatus according to claim 20, wherein the plate is monolithic.

22. A filling apparatus according to claim 19, wherein the substantially vertical axis is defined by a shaft, the plate being associated with the shaft.

23. A process for intermittently receiving and discharging quantities of bulk product from a weighing machine to a packaging machine, wherein the following steps are at least once successively performed in the method:

filling a specific quantity of bulk product into a first partial vessel through a first feed opening provided I the first partial vessel;

moving one outlet element from a first position into a second position so as to open an outlet opening of the first partial vessel and close an outlet opening of a second partial vessel and wherein, in the second position thereof, the outlet element is out of a path of travel defined through the outlet opening of the first partial vessel so that product may e discharged from the first partial vessel;

discharging product from the first partial vessel and simultaneously or subsequently filling a specific quantity of bulk product into the second partial vessel through a second feed opening provided in the second partial vessel;

moving said outlet element from the second position into the first position so as to open the outlet opening of the second partial vessel and close the outlet opening of the first partial vessel and wherein, in the first position thereof, the outlet element is out of a path of travel defined through the outlet opening of the second partial vessel so that product may be discharged from the second partial vessel; and wherein the outlet element comprises a plate that is rotatable about a substantially vertical axis between the first and second positions of the outlet element.

* * * * *